United States Patent [19]

Riegel

[11] Patent Number: 5,027,204
[45] Date of Patent: Jun. 25, 1991

[54] MEMORY FOR VIDEO SIGNALS

[75] Inventor: Maximilian Riegel, Nuremberg, Fed. Rep. of Germany

[73] Assignee: U.S. Philips Corporation, New York, N.Y.

[21] Appl. No.: 418,351

[22] Filed: Oct. 6, 1989

[30] Foreign Application Priority Data

Oct. 15, 1988 [DE] Fed. Rep. of Germany ....... 3835171

[51] Int. Cl.$^5$ ............................................. H04N 5/907
[52] U.S. Cl. .................................... 358/140; 358/336
[58] Field of Search ............... 358/140, 160, 314, 336, 358/163, 167

[56] References Cited

U.S. PATENT DOCUMENTS

| | | | |
|---|---|---|---|
| 4,684,985 | 8/1987 | Nakagaki et al. | 358/140 |
| 4,768,092 | 8/1988 | Ishikawa | 358/140 |
| 4,882,628 | 11/1989 | Sugimori et al. | 358/167 |
| 4,941,045 | 7/1990 | Birch | 358/140 |

FOREIGN PATENT DOCUMENTS 2000413  1/1979  United Kingdom ................ 358/140

Primary Examiner—Alvin E. Oberley
Assistant Examiner—Darin Miller
Attorney, Agent, or Firm—Anne E. Barschall

[57] ABSTRACT

The described memory is intended for video signals whose picture information is partitioned into fields and in which the information of the fields is arranged in lines. Separate field information components may be absent in the video signals to be stored. When fields are read from this store, they should be separated from one another by a vertical blanking interval. To avoid an elaborate write-read control for the memory and to simultaneously provide the possibility of connecting an interpolation circuit (IP) to it, with which the proximity values for the omitted fields are gained, a series arrangement of three shift registers (SR1, 1 SR2, SR3) is provided. A counter (ZW) generates and counts the shift pulses for the shift registers (SR1, SR2, SR3). Either the data of an incoming field (E1) or the data (E3) of the field stored in the third shift register (SR3) are applied to the first shift register (SR1) via a first controllable switch (U1). In a third position of the controllable switch (U1) the data (E2) of an interpolation circuit (IP) are applied to the first shift register (SR1), which circuit generates the data of an omitted field from the two neighboring fields by interpolation. The completed video signal arranged in a predetermined frame can be derived from an output (A) of the circuit.

4 Claims, 2 Drawing Sheets

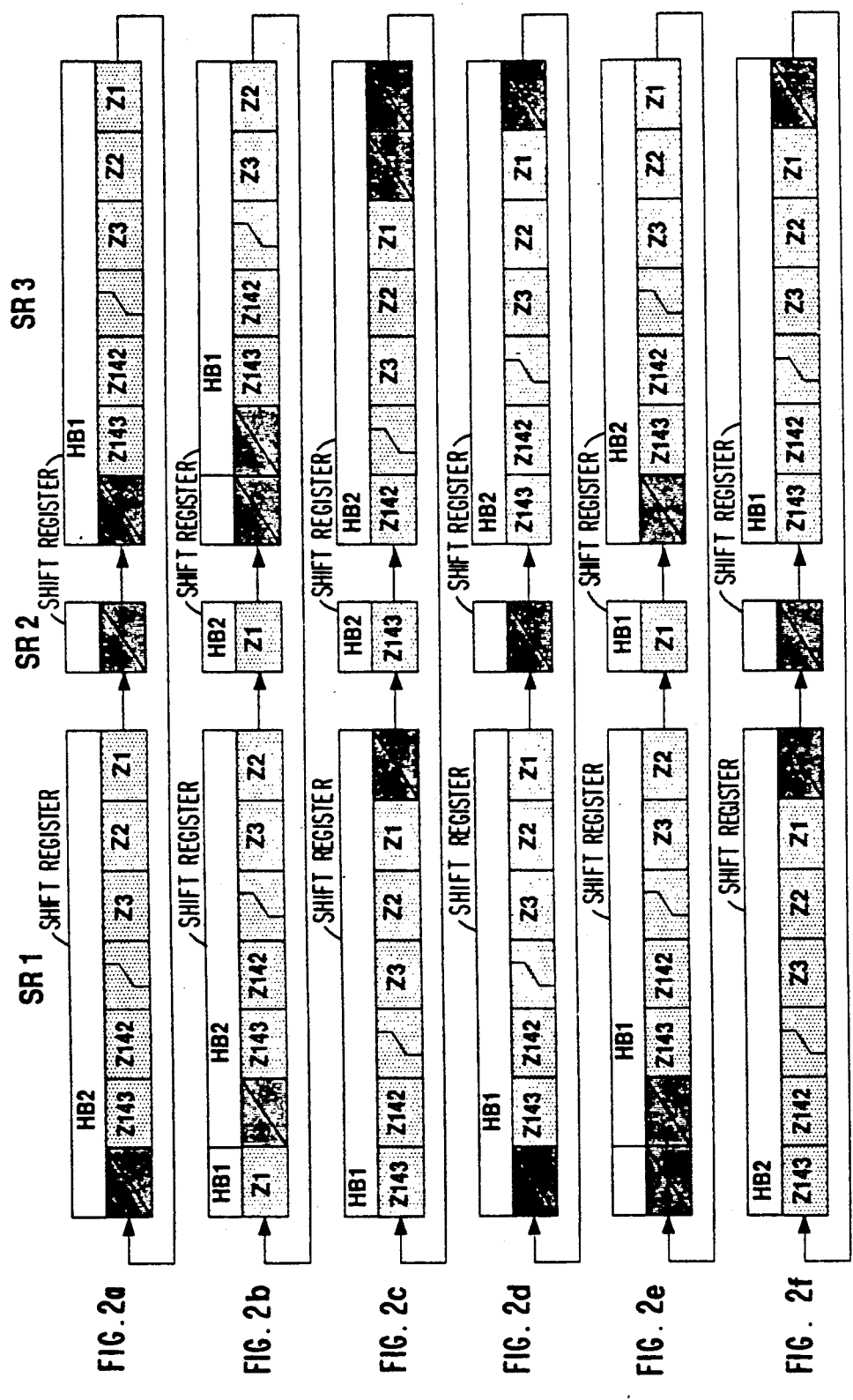

MEMORY FOR VIDEO SIGNALS

FIELD OF THE INVENTION

The invention relates to a memory for video signals whose picture information is partitioned into fields and in which the information of the fields is arranged in lines in which separate field information components may be absent and whose fields are separated from one another by a vertical blanking interval when they are read from the memory.

Memories for video signals—also referred to as video memories, video data memories or picture memories—are known. For example, DE 27 03 578 C2 corresponds to U.S. Pat. No. 4,183,058 describes a video data memory comprising a plurality of memory matrices, i.e. memory locations arranged in lines and columns. The contents of the memory locations are accessed via addresses for the memory locations (random access).

The use of such a video data memory, for example at the receiver end of a transmission system in which encoding of the picture information leads to a time-dependent bit rate, requires an elaborate write-read control, as will hereinafter be apparent.

An encoding operation which leads to a time-dependent bit rate is described, for example in DE 37 10 119. In such an encoding operation the video pictures are encoded in blocks (in sections), in which a number of bits which is dependent on the contents of its own block and on the contents of the same block of the previous picture is allocated to each block. It often happens that no picture information-carrying bits are allocated to a block because the contents as compared with those of the same block of the previous picture have not changed.

The bits which are thus irregularly allocated are written in a buffer memory and read from this memory at a constant bit rate. The filling level of the buffer memory must be constantly controlled in order that its overflow is prevented. If it tends to overflow complete fields are not encoded and the receiver will not transmit the encoded field but only information about the omission of a field. At the receiver end the transmitted data are initially read into a buffer memory and then transferred with a time-dependent bit rate to a picture memory. The omitted fields must at least approximately be regained by means of interpolation and with the aid of the picture memory so as to avoid considerable picture disturbances. Moreover, the overall video signal must be given a prescribed frame. A part of this frame is the so-called vertical retrace interval—a signal pause between two fields. For the purpose of interpolation the picture data of two lines of the previous field and two lines of the subsequent field are required. This requirement in itself already makes it clear which elaborate write-read devices and their control are required if an exclusively random access memory is used as a picture memory.

Assuming that the required control signals are available for, for example the omission of a field or the omission of block information, the invention has for its object to provide a video signal memory of the type described in the opening paragraph which can be connected with minor changes to an interpolation circuit with which estimated values for omitted fields are gained.

This object is solved by using a memory which is characterized by the following features:

1.1. a series arrangement of three shift registers of which the first and third shift registers comprise memory locations for one line more than the number of information-carrying lines constituting a field, and in which the second shift register comprises memory locations for one line, 1.2. a first controllable switch at the input of the first shift register via which either the data of an incoming field or the data of the field stored in the third shift register are applied to the first shift register, 1.3. a counter generating and counting the shift pulses for the shift registers and generating, during the vertical blanking interval, shift pulses for one line more in one field and clock pulses for two lines more in the subsequent field than the number of information-carrying lines in each field.

A first advantageous embodiment of the memory according to the invention is characterized by the following features:

2.1. the first controllable switch has a third position in which the data of an interpolation circuit are applied to the first shift register, 2.2. an input of the interpolation circuit is connected to the output of the first shift register and the data of an incoming field are applied to the second input of the interpolation circuit, 2.3. a second controllable switch via which either the output data of the first shift register or the data of an incoming field are applied to the second shift register is arranged between the output of the first shift register and the input of the second shift register.

Further advantageous embodiments relate to the interpolation circuit and to its connection to the memory according to the invention and are also described in the sub-claims.

BRIEF DESCRIPTION OF THE DRAWING

The invention will be described in greater detail with reference to an embodiment and the accompanying drawings in which FIG. 1 is the basic circuit diagram of an embodiment according to the invention and FIGS. 2a-f show processes in a series arrangement of three shift registers which form part of the memory according to the invention.

DETAILED DESCRIPTION OF THE INVENTION

Figure 1:
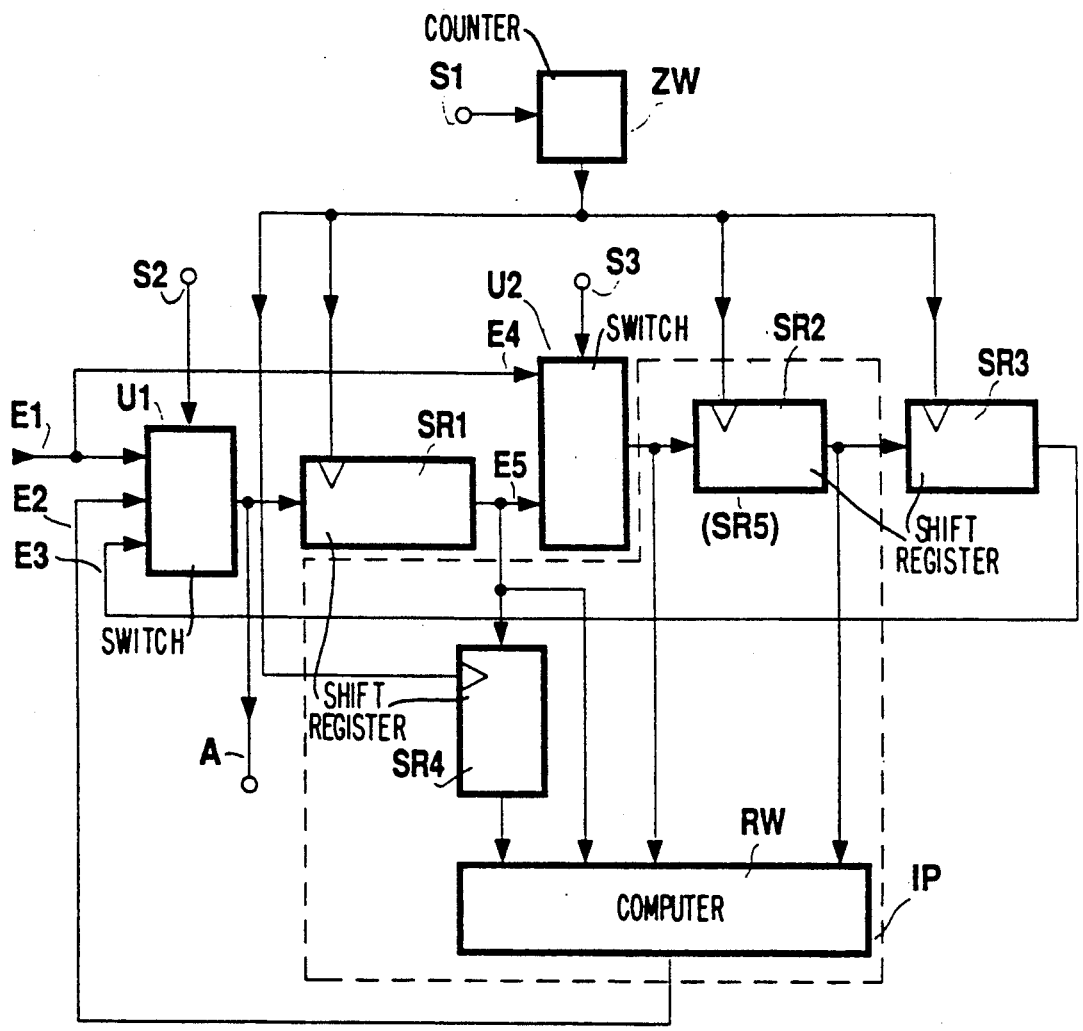

In FIG. 1 the data of a field read in the memory according to the invention are supplied on an input line E1 of a controllable switch U1. Dependent on the control signal, a given input of the switch U1 is connected to its output A via a control line S2. The output A of the controllable switch U1 is also the output of the overall circuit from which the overall video signal—arranged in a prescribed frame which is conventional for video data—can be derived.

If the data of a pixel of the field to be read are distinguished from the data of the corresponding pixel of the previous field with the same field number (no. 1 or no. 2), the input E1 is connected to the output A of the switch U1, dependent on the control signal which is present, and the data which are present are taken over in the first stages of a shift register SR1. Together with the take-over the data which are already stored are shifted by the same number of stages, which also applies to shift registers SR2 and SR3 which are arranged in series with the shift register SR1. The connection between the output of the shift register SR1 and the input of the shift register SR2 is established via a second controllable switch U2. In the relevant case the switch U2 is controlled via a control line S3 in such a way that it connects its input E5 to its output.

If there is conformity between the data of the pixels of an incoming field and the data of the corresponding pixel (pixel with the same coordinates) of the previous field of the same number, the input line E3 of the switch U1—controlled via the control line S2—is connected to its output. The data of the corresponding pixel of the previous field of the same number are then transferred from the last stage of the shift register S3 to the first stage of the shift register SR1.

It is to be noted that the conformity of the data of corresponding pixels—as described above—is already determined at the transmitter end. Instead of transmitting the same data once more, essentially shorter pulse sequences characterizing this conformity are transmitted for data reduction. These pulse sequences are converted, inter alia at the receiver end into the control signal on the line S2.

The fact that after each clock pulse—in so far as it does not fall in the vertical retrace interval between two fields—the data of the pixels described hereinbefore are present at the input E1 and at the input E3, is a result of the number of stages of the shift registers SR1, SR2 and SR3 and the number of shift pulses for each field adapted thereto. More precisely it holds that the shift registers SR1 and SR2 for two lines have more memory space than the overall number of lines of a field and that the shift register SR2 has memory space for one line. During the vertical blanking interval, thus during the period when no data are present at the output A, the shift registers are supplied with additional shift pulses by a counter ZW which is controlled via a control line S1, and this in alternating manner from retrace interval to retrace interval with shift pulses for one line and with shift pulses for two lines. The processes in the shift registers SR1, SR2 and SR3 will hereinafter be described in greater detail. It will be particularly apparent from this explanation at which positions in the circuit according to FIG. 1 the output signal is to be derived in the case of so-called oversampling.

If a field is absent in the video signal on the input line E1, the missing field is gained by means of an interpolation circuit IP from the last-received field stored in the shift registers SR1 and from the field received subsequently to the missing field. The information about a missing field is found, inter alia in the control signals on the lines S1 and S2; they connect the input line E2 to the output A of the switch U1 and the input line E4 of the switch U2 to its output. The output signal of the interpolation circuit IP is written in the shift register SR1 via the input line E2 and the incoming field is written in the shift registers SR2 and SR3 via the input line E4. The data of pixels of a line of the missing field are gained from the data of the pixels of two successive lines of the incoming field and the field stored in shift register SR1. These data are present at the input and output of the shift register SR2 and at the input and output of a shift register SR4. The input of the shift register SR4 is connected to the outPut of the shift register SR1; also the shift register SR4 comprises memory locations for one line. Inputs and outputs of the shift registers SR4 and SR2 are connected to inputs of a computer unit RW which computes the data of a pixel of the missing field in real time from the data of four pixels. In the present example the computer unit forms the arithmetic, unweighted average value from the mentioned data. As already mentioned above, the computed data are written in the shift register SR1.

The shift register SR2 has a dual function. On the one hand it is a part of the interpolation circuit IP and as such it bears the reference symbol SR5 between brackets; on the other hand it is also required as a shift register SR2 when the interpolation circuit IP is not required, thus when fields are never omitted, as already stated in the opening paragraph and as will now be described in greater detail.

FIG. 2 shows symbolically six instants of states a to f of the shift registers SR1, SR2 and SR3. In the relevant example a field comprises 143 information-carrying lines. At the instant a the information contents of a second field HB2 are stored in the shift register SR1, namely at the memory locations referred to as Z143, Z142 ... Z3, Z2 Z1. This also applies to a first field HB1 and the shift register SR3. Each rectangle of the shift registers SR1, SR2 and SR3 of FIG. 2 symbolizes the memory site for one line. No information is stored in the rectangles provided with a diagonal line.

It can be seen that the shift registers SR1 and SR3 comprise more memory space for a line than the number of information-carrying lines constituting a field.

The instant b results after a number of shift pulses corresponding to one line—shortly after one line. The information of the line Z1 of a field HB1 stored in the left-hand rectangle of the shift register SR1 may be either identical to information components of the information stored in the last rectangle Z1 at the instant a, but it may also be replaced by the incoming field or it may consist of a mixture of the two information components or of data which are calculated by the interpolation circuit IP—cf. the switch U1 of FIG. 1 and the explanation of its function. This also applies to all information components which are read in the shift register SR1.

The instant c shows the state of the shift registers SR1, SR2 and SR3 after 143 lines, i.e. after all information-carrying lines of a field. Subsequently the blanking interval starts in which the counter ZW supplies shift pulses for two lines. No shift pulses are supplied during the remaining period of the retrace interval. The instants d and e show the states after one and two lines, respectively, by which the contents of the shift registers have been shifted during the retrace interval.

The instant f shows the state at which 143 information-carrying lines have passed after the last retrace interval, thus shortly before a new retrace interval. In this retrace interval the overall contents of the shift registers SR1, SR2 and SR3 are only shifted by one line so that, as regards the form, this results in the instant a again.

FIG. 2 also shows clearly where the data required for a so-called oversamplinq are to be derived. In the relevant case the number of lines of a picture is doubled and lines of the same number of successive fields are simultaneously processed. For this purpose the data of the lines having the same number must also be simultaneously present. As is shown by instant a, this is the case at the input and output of the shift register SR1 if the data of a first field are applied to its input. If the data of a second field are applied to the input of the shift register SR1, the data must be derived again at the input of the shift register SR1 and at the output of the shift register SR2 (cf. instant e). For oversampling only a further switch is required which is controlled by a field signal and is connected to the output of the shift register SR1 or to the output of the shift register SR2.

The output signal of the shift register SR1 and the data of the incoming field are applied to the interpolation circuit IP; the connection between the shift registers SR1 and SR2 is interrupted during the calculation of the omitted field.

Assuming that a first field has been omitted, it is calculated from the data of the second field stored in the shift register SR1 (cf. instant a) and of the second field which is present on the input line E1 and which is simultaneously read in the shift register SR2 via the switch U2. Since inputs and outputs of the shift registers SR2 and SR4 are connected to the computer unit (cf. FIG. 1) and since these shift registers are empty at the start of the incoming second field (or may also be loaded with grey values), the data of the first line of the incoming second field (present on the input line E1), the first line of the second field HB2 stored in shift register SR1 as well as the grey values stored in the shift registers SR2 and SR4 are used for the calculation of the first line of the emitted first field. For the calculation of the second line, the second line of the incoming field and the first line stored in the shift register SR2 as well as the second line which is now present at the output of the shift register SR1 and the first line stored in the shift register SR4 are used. The same also applies to all further lines.

If the missing field is a second field the first data of the subsequent first field arrive when the shift registers are in a state shown by the instant d. At this instant grey values are stored in the shift registers SR2 and SR4. If the first line of the first field preceding the omitted second field is stored in the shift register SR2 and the first line of the incoming (second) field is stored in the shift register SR4, the computer unit starts with the calculation of the first line of the omitted second field. The second line of the preceding field is applied to it via the output of the shift register SR1 and the first line of the preceding field is applied via the output of the shift register SR4, while the second line of the incoming field is applied via the switch U2 and the first line of the incoming field is applied via the output of the shift register SR2. If the first line has been calculated, the data of the second line of the omitted field are calculated, namely from the second and third lines of the preceding field as well as from the first and second lines of the incoming field. The same also applies to all further lines.

I claim:

1. A memory for video signals whose picture information is partitioned into fields and in which the information of the fields is arranged in lines in which separate field information components may be absent and whose fields are separated from one another by a vertical retrace interval when they are read from the memory, comprising:
    1.1 a series arrangement of three shift registers (SR1, SR2, SR3) of which the first and third shift registers (SR1, SR3) comprise memory locations for one line more than the number of information-carrying lines constituting a field, and in which the second shift register (SR2) comprises memory locations for one line,
    1.2 a first controllable switch (U1) at the input of the first shift register (SR1) via which either the data of an incoming field (E1) or the data of the field stored in the third shift register (SR3) are applied to the first shift register (SR1) and
    1.3 a counter (ZW) generating and counting the shift pulses for the shift registers (SR1, SR2, SR3) and generating, during the vertical retrace interval, shift pulses for one line more in one field and shift pulses for two lines more in the subsequent field than the number of information-carrying lines in each field.

2. A memory as claimed in claim 1, in which:
    2.1 the first controllable switch (U1) has a third position in which the data of an interpolation circuit (IP) are applied to the first shift register (SR1).
    2.2 an input of the interpolation circuit (IP) is connected to the output of the first shift register (SR1) and the data of an incoming field are applied to the second input of the interpolation circuit (IP).
    2.3 a second controllable switch (U2) via which either the output data of the first shift register or the data of an incoming field are applied to the second shift register (SR2) is arranged between the output of the first shift register (SR1) and the input of the second shift register (SR2).

3. A memory as claimed in claim 2, in which the interpolation circuit (IP) has fourth and a fifth shift register (SR4, SR5), each of these shift register (SR4, SR5) has memory location for one line, and the input and output of each of these shift registers (SR4, SR5) are connected to an input of a computer unit (RW).

4. A memory as claimed in claim 3, in which the function of one of the two shift registers (SR4, SR5) of the interpolation circuit (IP) is taken over by the second shift register (SR2).

* * * * *